(No Model.) 5 Sheets—Sheet 1.
A. BIEDERMANN.
BRAKE.
No. 459,624. Patented Sept. 15, 1891.
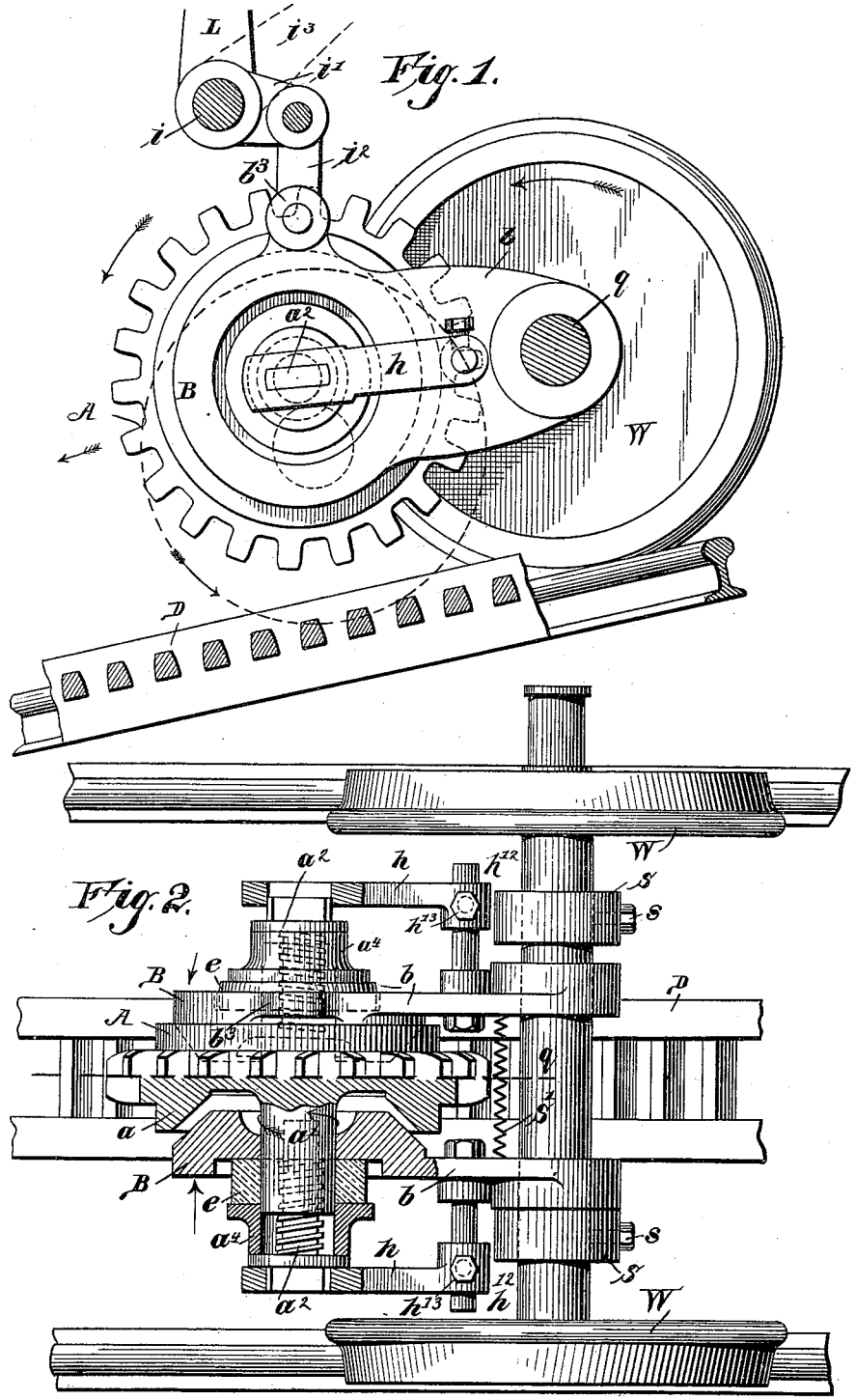
Witnesses:
H. T. Dieterich
O. W. Sommers
Inventor:
Alexander Biedermann,
Henry Orth
Atty.

(No Model.) 5 Sheets—Sheet 2.
A. BIEDERMANN.
BRAKE.
No. 459,624. Patented Sept. 15, 1891.
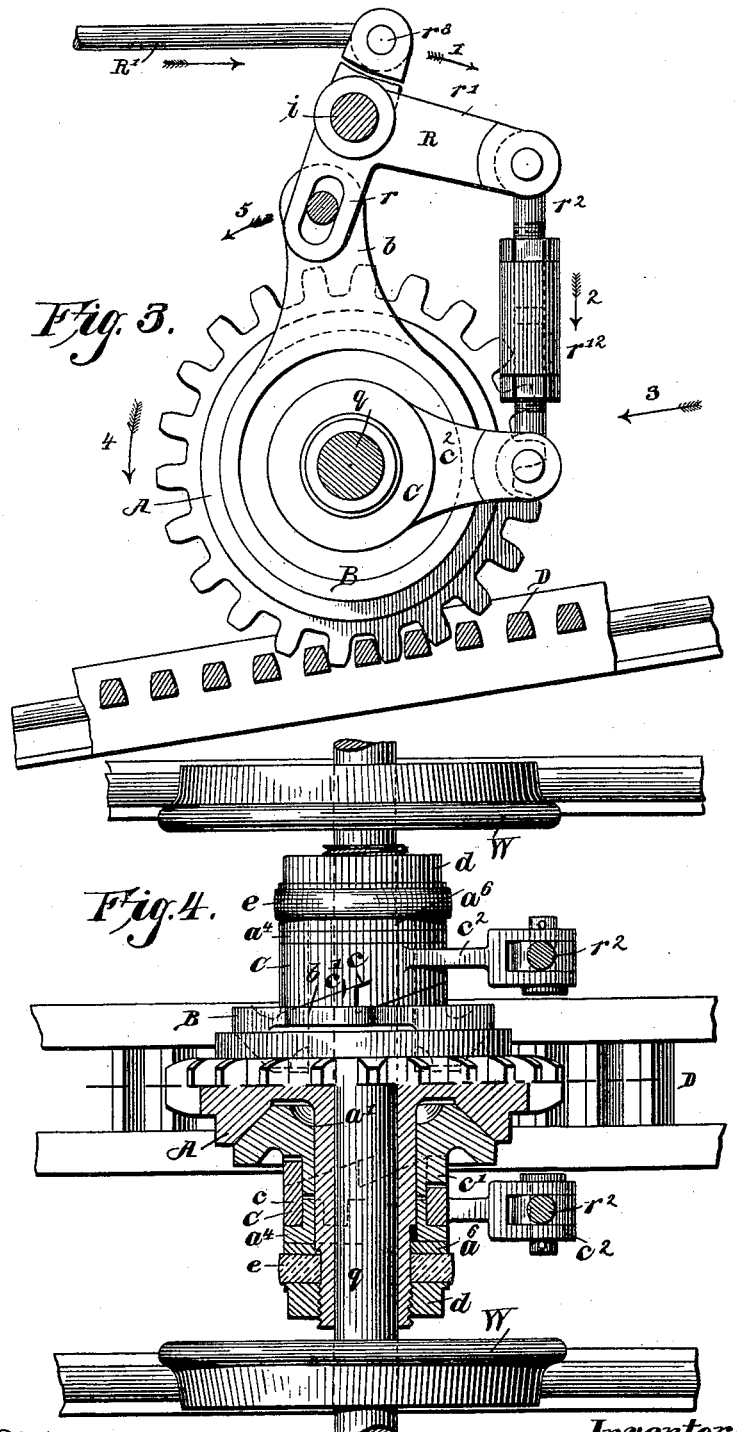
Witnesses:
H. G. Dieterich
P. W. Sommers
Inventor:
Alexander Biedermann.

(No Model.) 5 Sheets—Sheet 3.
A. BIEDERMANN.
BRAKE.
No. 459,624. Patented Sept. 15, 1891.
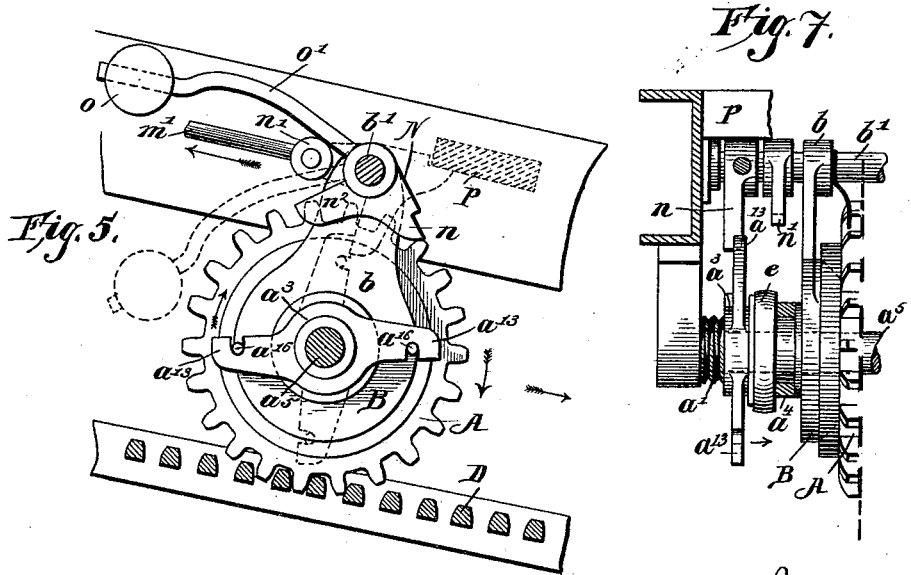
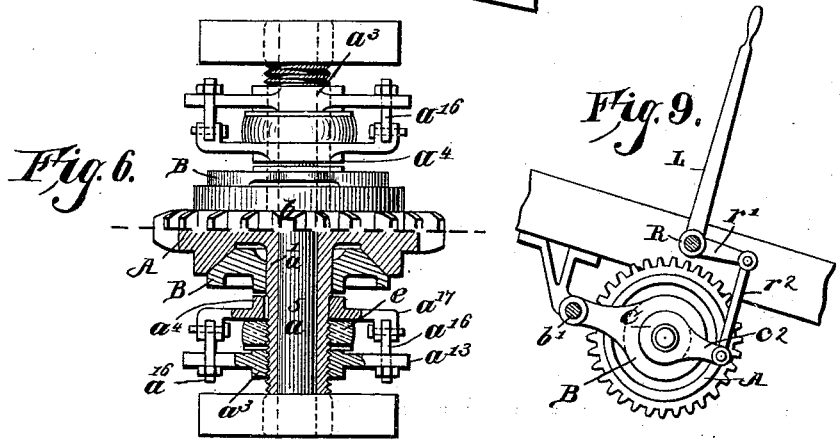
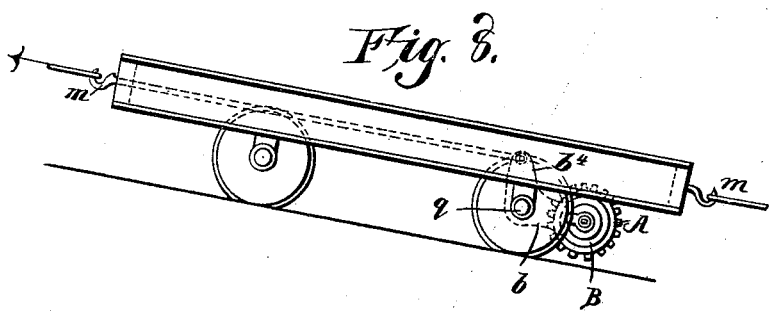
Witnesses:
H. G. Dieterich
B. W. Sommers
Inventor:
Alexander Biedermann
Atty.

(No Model.)  5 Sheets—Sheet 4.
A. BIEDERMANN.
BRAKE.
No. 459,624.  Patented Sept. 15, 1891.
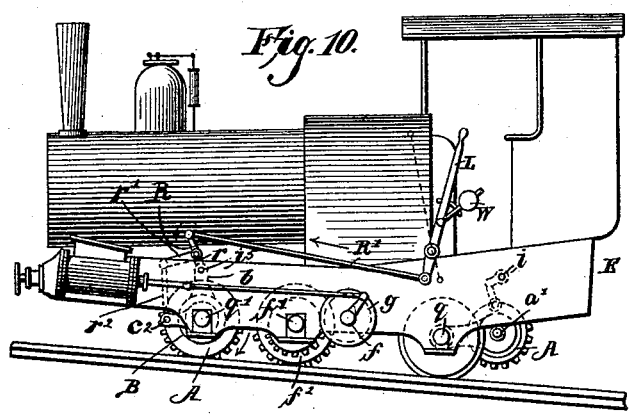
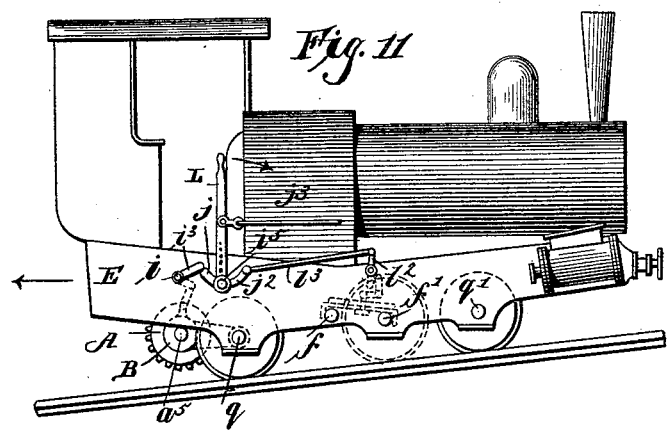
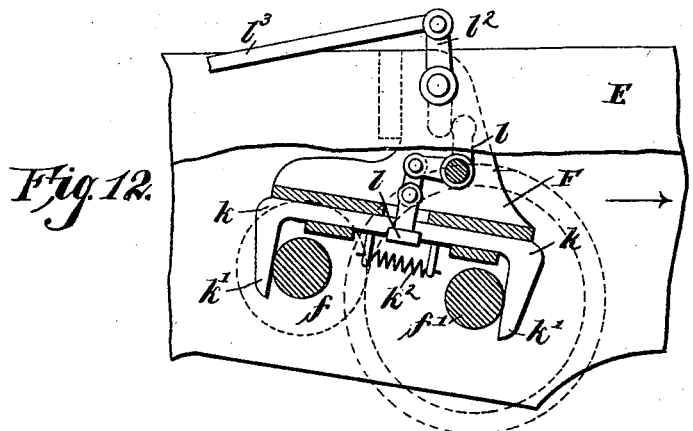
Witnesses:  Inventor:
H. G. Dieterich  Alexander Biedermann
P. W. Sommers  Atty.

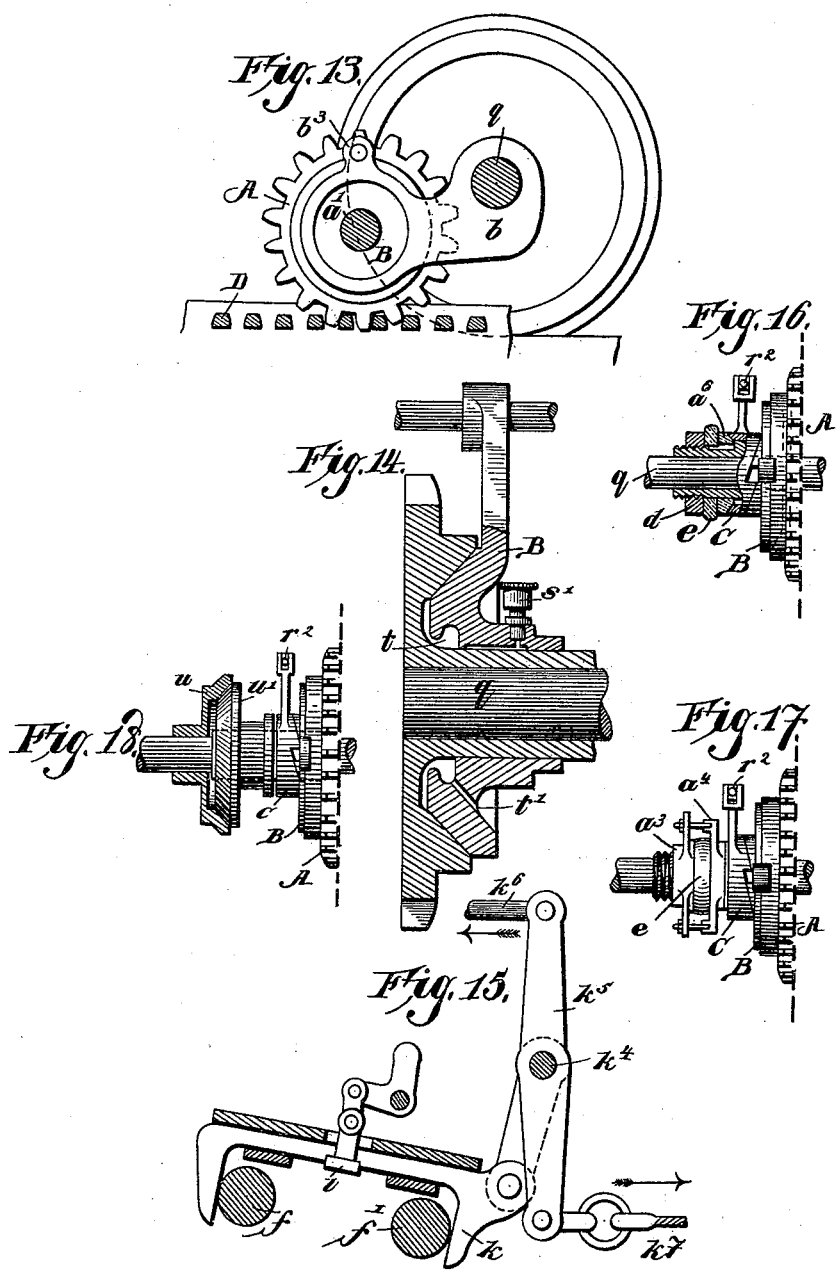

UNITED STATES PATENT OFFICE.

ALEXANDER BIEDERMANN, OF PARSCH, NEAR SALZBURG, AUSTRIA-HUNGARY.

BRAKE.

SPECIFICATION forming part of Letters Patent No. 459,624, dated September 15, 1891.

Application filed December 16, 1890. Serial No. 374,952. (No model.)

*To all whom it may concern:*

Be it known that I, ALEXANDER BIEDERMANN, mechanical engineer, a subject of the Emperor of Austria, residing at Parsch, near Salzburg, in the Province of Salzburg, in the Empire of Austria-Hungary, have invented certain new and useful Improvements in Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to improvements in brakes for vehicles or for driving or driven shafts, and has for its object to provide a brake of simple construction adapted to be operated by hand or to operate automatically and in which the brake action increases progressively, and to provide means for throwing the brake-operating devices automatically out of operation when a maximum brake action has been attained.

To these ends the invention consists, broadly, in a friction-brake in which the frictional surfaces are positively moved either by the driving or driven shaft or by extraneous means, and in which the contact between the friction-surfaces increases progressively; in the combination, with such a brake, of means for throwing out of operation the devices that impart motion to the friction-surfaces whenever a maximum frictional contact has been attained, and, lastly, the invention consists in the construction of the brake and in the combination of co-operative parts, as will be more fully described hereinafter.

The essential features of my improved brake consist in a revoluble friction-disk combined with a co-operating friction disk or disks adapted to have motion toward or from the revoluble disk, devices whereby the frictional contact is progressively increased as the revoluble disk revolves, and means for throwing said devices out of operation whenever a maximum force of friction is attained; and these devices may be variously modified in their relative arrangement and in their combination with the driving or driven shaft upon which they act. For instance, the revoluble disk may have motion imparted thereto, positively or otherwise, from a device other than the shaft or axle with which the brake co-operates, or said disk may have motion imparted to it by the said shaft or axle, and this motion of the disk may be intermittent—that is to say, such motion may be imparted to the disk whenever the brake is to be applied—or the motor may be a continuous one, devices controlled by an auxiliary power being employed for imparting a to-and-fro motion to the co-operating friction disk or disks; finally, the brake may be constructed to be operated by hand or to operate automatically, or both.

In order that my invention may be fully understood, I will describe the same in detail, reference being had to the accompanying drawings, in which—

Figure 1 is a sectional side elevation, and Fig. 2 a like plan view, of a brake adapted for use on railways in which a toothed rail intermediate of the track-rails and a gear-wheel on the driving-shaft of the locomotive are employed as a means of propulsion and in which the revoluble friction-disk has motion imparted thereto by engagement with the toothed rail, means being provided for lowering and raising the disk to and from such rail. Figs. 3 and 4 are views similar to Figs. 1 and 2, the revoluble friction-disk being in perpetual engagement with the toothed rail and having, therefore, a continuous rotation so long as the car or locomotive is in motion. Figs. 5, 6, and 7 illustrate by a sectional side view, a like plan view, and a face view a brake adapted to operate automatically or to so operate and be operated by hand. Fig. 8 shows in side elevation a car-truck for cable roads, hoists, or lifts provided with an automatic brake. Fig. 9 shows in side elevation a modified construction of hand-brake. Figs. 10 and 11 are side views of a locomotive for inclined rack-rail tramways provided with a brake adapted to operate automatically or to be operated by hand. Fig. 12 is a sectional detail view of safety devices adapted to co-operate with the brake shown in Fig. 11. Figs. 13, 14, and 15 are sectional detail views, and Figs. 16, 17, and 18 are also detail views showing slight modifications in the construction of the brake.

I will first describe the brake as constructed for use on rack-rail tramways, or ordinarily called "mountain" or "inclined-plane" tramways, in which the brake-wheel is normally stationary.

Referring to Figs. 1 and 2, D indicates the rack-rail or toothed rack between the ordinary track-rails, $q$ one of the wheel-axles of a truck or locomotive, and W the wheels. A toothed wheel A is provided with an extended hub $a'$, in the opposite ends of which are formed screw-threaded bearings for right and left hand screw-spindles $a^2$, the squared heads of which are seated in a slot formed in links or arms $h$, adjustable by means of set-screws $h^{13}$ on pins or bolts $h^{12}$, secured to the radial arms $b$, formed on or secured to the conical friction-disks B, that co-operate with the toothed brake-wheel A and constitute the brake devices, said wheel A being provided with a conical recess $a$ in its opposite faces, forming friction surfaces or bearings for the like surfaces of the disks B, the arms $b$ of said disks being provided with a bearing for the axle $q$, upon which said arms are loosely mounted, so as to have endwise motion thereon, which motion is adjusted and limited by means of two sleeves S S and set-screws $s$ $s$, working in the sleeves and impinging on the axle. It will thus be seen that the brake has its pivot on the wheel-axle, the following means being employed to lower the brake to and raise it from the rack-rail D. Each friction-disk B has a pivot-bearing $b^3$ for the connection of a link $i^2$, that is pivoted to a radial arm $i'$ on a rock-shaft $i$, to which is secured the operating-lever L, a suitable locking device being provided, as usual, to lock the lever against movement under the weight of the brake. It is obvious that if the lever L, Fig. 1, is moved from left to right the brake will be lowered to the rack-rail D and the toothed disk A will be revolved by engagement with the said rail. Inasmuch as the screw-spindles $a^2$ are held against rotation by the arms $h$, said spindles will screw into the hub $a'$ of the brake-wheel A. This movement of the screw-spindles may be communicated to the friction-disks B, which are loosely mounted on the hub $a'$ of wheel A by any desired means—as, for instance, by means of a sleeve interposed between the head of the screw-spindles and the friction-disks. I prefer, however, to interpose an elastic cushion or washer between said devices and the disks B, and, as shown in Fig. 2, $a^4$ is the flanged sleeve and $e$ the elastic washer. It is obvious that as the screw-spindles move inwardly their heads gradually move out of the slots in the arms $h$, and when a maximum pressure is attained—that is to say, when the frictional contact between the wheel and disks is such as would cause the rotation of said wheel—the spindle-heads will have left the slots in the arms, whereby the further action of said screw-spindles is stopped. Inasmuch as the pressure exerted by the disks B upon the brake-wheel A is a gradually-increasing one, the movement of the car or train will be gradually but rapidly stopped. Instead of the slotted arms $h$ for holding the screw-spindles against rotation, said arms may be provided with cone-bearings, the spindles having like bearings and providing means for appressing the cone-bearings to the screws.

As shown in Figs. 1 to 6, the teeth of the wheel A are made tapering or conical at their outer ends, so as to insure their engagement with the teeth of the rack-rail on the sharpest curves. It is obvious that instead of a toothed wheel A and rack-rail D a friction-wheel and a friction-rail can be used to set the brake.

The means for imparting motion to the friction-disks B toward the brake-wheel A may be variously modified. For instance, as shown in Figs. 3 and 4, in which the brake is mounted on the wheel-axle $q$ itself and the brake-wheel A is in perpetual engagement with the rack-rail D, the journals of the said brake-wheel are extended and the friction-disks B are loosely mounted on said journals and provided with clutch-teeth $c'$, adapted to engage similar teeth $c$ on the face of a clutch-sleeve C, loose on the journal of the friction-disks B, a nut $d$, screwed to the outer end of the journals of the brake-wheel, and an elastic buffer or washer $e$ serving as abutments and for taking up back-pressure. As shown in Fig. 4, the clutch-sleeve C is confined by the pressure-transmitting sleeve $a^4$, and to prevent pressure being applied to said sleeve and through the same to the clutch-sleeve C by the elastic buffer or washer $e$ I interpose a suitable washer $a^6$, which is desirable when the brake-wheel is in perpetual engagement with the rack-rail and is constantly revolved thereby. The clutch-sleeves C have a radial arm $c^2$, that is pivotally connected with a link $r^2$, constructed in two parts adjustable within a sleeve $r^{12}$, having interior right and left hand screw-threads, the link-sections being correspondingly threaded. The link $r^2$ is pivoted to an arm $r'$ of a bell-crank lever R, whose arm $r$ is slotted, and through said slot projects a pin on the radial arm $b$ of the friction-cones B. The bell-crank lever R is secured to rock-shaft $i$, that has its bearings in the truck-frame, to which shaft the operating-lever L, Fig. 1, is connected; or said shaft may have a radial arm $r^3$, to which is pivoted a connecting-rod R', that connects the bell-crank lever through the rock-shaft with the operating-lever L. It will readily be seen that if power is applied to move the rock-shaft $i$ in the direction of the arrow 1, the car or train moving in the direction of the arrow 3 and the brake-wheel revolving in the direction of the arrow 4, the clutch-link will move in the direction of the arrow 2, while the friction-sleeve will move in the direction of the arrow 5, Fig. 4, thereby causing the wedge-teeth on the sleeves and friction-disks to move upon each other, wedging said disks to the brake-wheel A. This form of brake is more especially adapted for use as a hand-brake, but may be used as a safety-brake and operated automatically, as will hereinafter appear.

Instead of either form of friction-disk-actuating devices described in reference to Figs. 1 to 4, inclusive, the construction shown in Figs. 5 and 6 may equally as well be adopted. The wheel A may be loosely mounted on a spindle $a^5$, and the tubular hubs or journals of said wheel may be made longer and provided with right and left hand peripheral screw-threads at its opposite ends for the reception of a nut $a^3$, the friction-disks B in this case being loosely mounted upon the inner unthreaded portion of the wheel-journals $a'$, and are moved toward said wheel by the nuts $a^3$, having bearing on the disks B, or preferably through the medium of intermediate devices, as shown in Figs. 5 and 6, which devices consist of the power-transmitting sleeve $a^4$, hereinbefore referred to, and an elastic cushion or washer $e$, interposed between said sleeve and the nut, which are both provided with radial arms $a^{14}$ $a^{13}$, respectively, and connected by bolts $a^{16}$, that are pivoted to the radial arms $a^{14}$ of the sleeves $a^4$ and are seated in notches or recesses in the like arms $a^{13}$ of the nuts $a^3$. The arrangement of pressure-transmitting sleeves $a^4$ has in this instance also for its object to prevent pressure being applied by the elastic washer or buffer $e$ when the brake is not in use, and said buffer has also for its object to provide an elastic bearing for taking up back-pressure and for graduating the power exerted by the friction-disks upon the brake-wheel.

It has been stated that either of the brakes described in reference to Figs. 1 to 6 may be operated automatically or may be so operated as well as by hand, and this also may be done in various ways, according to the mode of propulsion of the vehicle or to the application of the brake to such vehicle. For instance, if the brake shown in Figs. 1 and 2 is used on a traction-road the brake can be pivotally mounted, as shown in Fig. 8, upon one of the wheel-axles $q$ by means of bell-crank levers $b$ $b^4$, instead of the radial arms $b$, the draw-bar $m$ being connected with the arms $b^4$ of the bell-crank levers. It is obvious that should the draw-bar break the brake will drop and the brake-wheel A will be brought into engagement with the rack-rail. If the brake is to be operated by hand also, the shaft $i$, Fig. 1, has a radial arm $i^3$, Fig. 12, the end of which has bearing upon an arm $j$ on the rock-shaft $i^5$, to which is secured the operating-lever L, which lever is connected by a wire or rope $j^3$ with the draw-bar. Should the draw-bar break, the lever L will be tilted either to the left or right, according as the break occurs on one or the other side of the connection between said lever and the draw-bar, thereby releasing the arm $i^3$ and allowing the brake to drop to bring the brake-wheel A into engagement with the rack-rail D, the draw-bar being in this case not directly connected with the brake. As the lever can at any time be moved by hand toward the right or in the direction of the flexible connection $j^3$, the arm $i^3$ can be released to bring the brake-wheel into engagement with the rack-rail.

In the use of the brake, Figs. 1 and 2, as a safety-brake for locomotives on inclined-plane tramways I prefer to pivot the brake on the rear trailing wheel, as shown in Fig. 12. The trains or cars on inclined tramways or railroads are now generally controlled by means of air-brakes operating through crank-rods upon the brake devices that operate either upon the driving-axle $f$ or upon the driver or drivers on said axle. Should the driving-axle $f$ break or the transmitting-shaft $f'$, Figs. 11 and 12, that transmits the power to said axle $f$, the air-brake would be absolutely useless; but when the cars are provided with the described safety-brake accidents resulting from the breakage of either axle $f$ or $f'$ can be avoided.

In order that the brake may operate automatically when applied to the cars of rack-rail inclined planes in case of the breakage of the driving or transmitting shaft or axle, or both, I provide the following devices, reference being more particularly had to Fig. 13. A bracket-bearing F, secured to the truck E of the locomotive or to that of a car, is provided with guideways in which two safety locking-arms $k$ have free motion, said locking-arms having a recess in their proximate faces for the reception of the retaining-bolt $l$, which is firmly held in said recesses by a spring $k^2$, that draws the arms $k$ to the bolt. As shown, the vertical portions $k'$ of the arms $k$ straddle the driving and transmitting axles, and the bolt $l$ is connected by a link with one arm of a bell-crank lever $l'$, whose other arm has bearing upon one of the arms of a two-armed lever or upon radial lug or arm on the pivot-shaft of a crank arm $l^2$, which crank-arm is connected by cord or rod $j^3$ aforementioned with the operating-lever L, or, as shown in Fig. 12, by means of a rod $l^3$, which is connected to an arm $j^2$ on the fulcrum stud or shaft $i^5$ of said lever, to which shaft is also secured the radial arm $j$, upon which the like arm $i^3$ has bearing, as above described. Should either or both shafts $f$ $f'$ break, the arms $k$ would thereby be drawn apart and the locking-bolt $l$ withdrawn by the stress exerted upon the lever L by the weight of the brake devices. The wire rod or cord $j^3$ may, in the described arrangement, be carried to any one of the cars or to the rear car of a train and the lever L operated from that point by hand. The brake may also be set by hand if means are provided for disengaging the bolt $l$. This may be readily effected by the mechanisms shown in Fig. 13, in which the front safety locking-arm $k$ is pivotally connected with a crank or radial arm $k^3$, secured to a shaft $k^4$, that has its bearings in the truck-frame, and on said shaft $k^4$ is secured a two-armed lever $k^5$, one of the arms of which is connected by a rod $k^6$ with an operating-lever—as, for instance, the lever L, Fig. 12—or a lever similar thereto, which may be located in proximity to or within the engineer's cab for operation from that point. The other arm of the lever $k^5$ has a rod or wire or a cord attached thereto that may run along the train of cars to the last one, so that it may be pulled from any one of the cars. It is obvious that if power is applied to lever $k^5$ through rod $k^6$ in the direction of its arrow by means of an operating-lever the right-hand arm $k$ will be moved in a reverse direction to release the bolt, the same result being obtained by power applied to the wire or cord $k^7$ in the direction of its arrow so long as the operating-lever is locked in position, as will be readily understood.

In a brake of the construction described the brake-wheel can be made so small that when lowered to the rack-rail or when in permanent engagement therewith the axis of the brake-wheel A will be below the axis of the trailing-axle, as shown in Fig. 14, which is of great advantage, in that the weight of the brake devices is thereby materially reduced, while the supporting-arms $b$ can be correspondingly shortened.

When the brake-wheel is in permanent engagement with the rack-rail, as shown in Figs. 5 and 6, means may be provided for automatically actuating the friction cones or disks B by providing suitable locking devices to lock the nuts $a^3$ against rotation. As shown in Figs. 5, 6, and 7, this can be accomplished by means of a stop-pawl N. The shaft $a^5$, upon which the brake devices are mounted, may revolve idly with said devices, or it may have its bearings in a suitable framing or in hangers secured to the locomotive. The stop-pawl N may be hung from the wheel-axle to which the brake is pivoted and arranged to have bearing on an abutment $p$, or a separate bearing $b'$ may be provided for said pawl adapted to have bearing on an abutment $p$. The pawl is so constructed that when in a normal position the arms $a^{13}$ of the nuts $a^3$ will pass freely by it, but when tilted into the position shown in dotted lines in Fig. 5 they will impinge upon the arm $n^2$ and carry the arm $n$ thereof to the abutment $p$, thus locking the nuts against rotation, and as the brake-wheel A revolves the nuts will move the friction cones or disks B gradually into contact with the brake-wheel, the force or pressure being a gradually progressive one. The pawl N has an arm $o'$, that carries a weight $o$, the tendency of which is to tilt the pawl to bring its arm $n'$ into the path of the radial arms $a^{13}$ of the nuts $a^3$, and said pawl has a second arm $n'$, to which is pivoted one end of a rod or cord $m'$, that may be connected with the draw-bar of the car, Fig. 8, to hold the pawl in its normal position, or said rope or rod $m'$ may be connected with the operating-lever L, Fig. 12, taking the place of the rod $l^3$. It is obvious that so long as a strain is exerted upon the pawl N it will be maintained in its normal position; but should the draw-bar or draft-rope break when the brake is used on a traction road or should the lever L be moved to remove the strain the weight $o$ will tilt the pawl into the position shown in dotted lines in Fig. 5, resulting in the stoppage of the rotation of the nuts $a^3$. In their inward movement the arms $a^{13}$ of the nuts $a^3$ move away from the pawls, so that when a maximum pressure has been reached said arms will have been moved clear of their pawls, thus relieving the brake of overstrain. When the pawls N, of which there is one for each nut $a^3$, as will be readily understood, are secured to a separate rock-shaft $b'$, the arm $n'$ need not form an integral part of the pawl, but may be secured to the shaft $b'$ at any convenient point, as shown in Fig. 7.

I have hereinbefore stated that in order to prevent pressure being exerted upon the cone-disks B by the rubber cushions $e$, I connect said cushions with the nuts $a^3$ by means of the pressure-sleeve $a^4$ and bolts $a^{16}$, that lie in slots in the arms $a^{13}$ of the nuts $a^3$. When, however, the said arms contact with their pawl, the rubber cushion and sleeve continue to revolve with the wheel A, the bolts $a^{16}$ moving out of their slots, so that the cushion is free to act upon said sleeve. Although I prefer this arrangement as a precautionary measure, it is not absolutely necessary.

I have hereinbefore stated that the brake is or may be supported from or mounted on the trailing-axle of the locomotive, but it may with equally good results be mounted on the front-wheel axle $q'$ of the locomotive, as shown in Fig. 11, whether the brake-wheel A is in permanent engagement with the rack-rail D or not. When in permanent engagement with the rack-rail, the rod $R'$, hereinbefore referred to and shown in Fig. 3, is connected with a crank or radial arm on the pivot of the operating-lever L or with one of the arms of a two-armed operating-lever, as shown in said Fig. 11. The lever is held tilted to the right by a weight $w$; but if said lever is brought to the position $x$ (shown in dotted lines) the clutch-sleeves C will move the friction-cones into contact with the brake-wheel, as will be readily understood.

In the construction of brake shown in Figs. 3 and 4 no provision is necessary for protecting the friction-cone-operating devices against an excess of pressure, as it is obvious that as soon as a normal maximum pressure or frictional contact is reached that would cause the cones B to revolve the clutch-teeth on the hub of wheel A and cones B will slide upon and past each other, thus relieving the parts of all breaking strain; but as the clutch-teeth slide upon each other the pressure exerted upon the cones will be increased, and as this increased pressure is translated into strain upon the arms $b$ of the cones the said strain will be exerted upon the arm $r$ of bell-crank lever R and through the arm $r'$ thereof to the link $r^2$, thereby revolving the clutch-sleeve C in a direction contrary to that of rotation of wheel A, so that the clutch-faces will be moved in reverse directions by the bell-crank lever R, acted upon by the cones B in one direction and acting upon the sleeves C in a reverse direction, thereby increasing the wedging action of said clutch-faces, the normal maximum pressure being here utilized to increase such pressure through the medium of the mechanism described.

In the construction of brake shown in Figs. 3 and 4 the pressure-sleeve, or more properly the counter-pressure sleeve, $a^4$ is used to hold the clutch-sleeve C against rotation with the axle $q$, and said sleeve may have clutch-teeth engaging like teeth in the cone hubs or journals. As shown in Fig. 15, the cones B may be provided with lubricators $s'$, the cones having annular lubricant-chambers $t$ communicating with an exhaust-duct $t'$.

Instead of the arrangement described in reference to Figs. 3 and 4, the arm $c^2$ of the clutch-sleeves may be connected by link $r^2$ with the bell-crank lever R, so that said sleeves can be rotated by the hand-lever L, as shown in Fig. 11, to move the sleeves C into engagement with the clutch-faces of the cones B, or said link $r^2$ may be connected with a radial arm on the lever-fulcrum for lowering the brake to the rack-rail, as shown in Fig. 9, the cone-sleeves being pivoted to a shaft $b'$, as hereinbefore stated. If desired, springs $S'$ may be interposed between the arms $b$ of the friction-cones B to more effectually hold the said cones against motion toward each other when the brake is not in use.

The brake shown in Fig. 4 may be so modified as to be inoperative during the motion of the vehicle in one direction and to be set automatically as the vehicle moves in a reverse direction. In this case the counter-pressure sleeves $a^4$ are dispensed with, and the washers $a^6$ are provided with journals or bearings for the clutch-sleeves C, so that said sleeves will be revolved by frictional contact with the washers in one or the other direction, and the frictional contact between the washer and sleeve may be increased by making the journal in the form of a cone, fitting into a conical bearing in the end of the sleeves C, as shown in Fig. 17.

The features of the brakes shown in Figs. 4 and 6 may be combined, as shown in Fig. 18, so that the brake may be used either as an ordinary hand-brake or as a safety-brake, the clutch features being used in setting the brake by hand, the sleeves $a^4$ serving as abutments or counter-pressure sleeves.

In order that the brake may be applied to non-driving or supporting wheels—that is to say, wheels revolving loosely on or with their axle or shaft—and also to adapt the brake for use without a spur brake-wheel, either the wheels or their axles, according as said wheels revolve thereon or therewith, are provided with friction-cones $u$, with which co-operate cones $u'$ on the clutch-sleeves C, said cones $u$ being pivoted to a support like the cones B, which latter are provided with clutch-teeth for engagement with the teeth on one of the faces of the sleeves C, which in this instance have clutch-teeth on their opposite faces, the teeth on the other face engaging with the clutch-teeth on the hubs of the cones $u'$. It is obvious that if a partial rotation is imparted to the sleeves C the cones $u'$ will be forced into the cones $u$ and the friction-cones B into the conical recesses of the wheel A, and that the greater the power applied the greater will be the pressure exerted by the cones $u'$ and B.

Having thus described my invention, what I claim is—

1. The combination, with a stationary toothed rail, of a car-brake comprising a revoluble toothed friction-wheel adapted to gear with said rail, a friction-cone, and an actuating device for moving the friction-cone into contact with the friction-wheel, for the purpose set forth.

2. The combination, with a stationary toothed rail, of a car-brake comprising a revoluble toothed friction-wheel adapted to gear with said rail, a friction-cone, and an actuating device consisting of a nut and screw for moving the cone into contact with the friction-wheel, for the purpose set forth.

3. The combination, with a stationary toothed rail, of a car-brake comprising a revoluble toothed friction-wheel adapted to gear with said rail, a friction-cone, and an actuating device operated by the friction-wheel to move the cone into contact with said wheel, for the purpose set forth.

4. The combination, with a stationary toothed rail, of a car-brake comprising a revoluble toothed friction-wheel adapted to gear with said rail, a friction-cone, and an actuating device consisting of a nut and screw operated by the friction-wheel to move the cone into contact with said wheel, for the purpose set forth.

5. The combination, with a stationary toothed rail, of a car-brake comprising a revoluble toothed friction-wheel adapted to gear with said rail, a friction-cone, and an actuating device consisting of a screw operating upon the friction-cone, and a nut revoluble with the friction-wheel and working on the screw to impart a longitudinal motion thereto, for the purpose set forth.

6. The combination, with a stationary toothed rail, of a car-brake comprising a toothed friction-wheel adapted to gear with said rail, a friction-cone, an actuating mechanism for moving the cone into contact with the friction-wheel, and a releasing device operating automatically to throw the actuating mechanism out of operation under a given pressure of the cone on the wheel, for the purpose set forth.

7. The combination, with a stationary toothed rail, of a car-brake comprising a toothed friction-wheel adapted to gear with the rail, a friction-cone, a nut revoluble with the friction-wheel, a screw connected with the friction-cone and working in said nut, and a fixed holder in which said screw is loosely held against rotation, said holder being arranged relatively to the screw, so that the latter will move out of its bearing in the holder under the action of the nut, for the purpose set forth.

8. The combination, with a stationary toothed rail and a car-axle, of a car-brake comprising a pair of friction-cones suspended from and having motion along the axle, a toothed friction-wheel arranged between and revoluble in bearings in said cones, an actuating mechanism for moving the cones into contact with the wheel, a lever fulcrumed on the car, and a connection between the lever and one or both cones for lowering or raising the brake to bring the friction-wheel into or out of engagement with the toothed rail, for the purpose set forth.

9. The combination, with a stationary toothed rail and a car-axle, of a car-brake comprising a pair of friction-cones suspended from and having motion along the axle, a toothed friction-wheel arranged between and revoluble in bearings in said cones, an actuating mechanism for moving the cones into contact with the wheel, a crank-shaft connected with one or both cones, said crank-shaft having a stop-arm $i^3$, and a tripping-lever fulcrumed on the car and having an arm $j$, upon which the stop-arm $i^3$ has bearing, for the purpose set forth.

10. The combination, with a stationary toothed rail and a car-axle, of a car-brake comprising a pair of friction-cones suspended from and having motion along the axle, a toothed friction-wheel arranged between and revoluble in bearings in said cones, a pair of nuts revoluble with the wheel, a pair of non-revoluble screws working in said nuts, a connection between the screws and the friction-cones, and means operated from the car for lowering and lifting the brake to engage the friction-wheel with or disengage it from the toothed rail, for the purpose set forth.

11. The combination, with a stationary toothed rail, a car-brake adapted to be operated by said rail, a crank-shaft, a link connection between said shaft and the brake, a holder to hold the brake out of engagement with the toothed rail and the driving and driven axles of a car, of a safety device comprising a tripping mechanism for tripping the brake-holder to release said brake, a locking-bolt for locking the tripping device against operation, and two sliding catches or arms in engagement with the driving and driven shafts, respectively, and engaging the locking-bolt, for the purpose set forth.

12. The combination, with a stationary toothed rail and a car-wheel axle, of a car-brake suspended from said axle and adapted to be operated by the stationary toothed rail, and a connection between said brake and the draft-bar of the car for holding the brake out of engagement with the toothed rail, for the purpose set forth.

13. The combination, with the stationary toothed rail, a car or locomotive axle, a car-brake suspended from said axle and adapted to be operated by said rail, a retaining device to hold the brake out of engagement with the rail and the driving and driven axles of the car or locomotive, of safety devices consisting of the sliding angle-bars K' in engagement with said axles, the headed bolt $l$, engaged by the bars, the bell-crank lever $l'$, linked with the bolt $l$, the tripping-lever $l^2$, and a connection between said lever and the retaining devices for the car-brake, for the purpose set forth.

14. The combination, with the toothed rail D and a car-axle, of the friction-cones B, having arms $b$ loosely mounted on the axle, and the toothed friction-wheel A, having interiorly-threaded journals $a'$ loosely mounted in the cones, the screws $a^2$, working in said journals of the wheel, a connection between the screws and the cones, and a locking device connected with the friction-cones for locking the screws against revolution, for the purpose set forth.

15. The combination, with the toothed rail D and a car-axle, of the friction-cones B, having arms $b$ loosely mounted on the axle, and the toothed friction-wheel A, having interiorly-threaded journals $a'$ loosely mounted in the cones, the screws $a^2$, working in said journals of the wheel, a connection between the screws and the cones, and a locking device consisting of the arms $h$, supported from the arms $b$ of the cones, said arms $h$ having a polygonal slot for the reception of the like heads of the screws, for the purpose set forth.

16. The combination, with the toothed rail D and a car-axle, of the friction-cones B, having arms $b$ loosely mounted on the axle, and the toothed friction-wheel A, having interiorly-threaded journals $a'$ loosely mounted in the cones, the screws $a^2$, working in said journals and having a circular flange and a polygonal head at their outer end, a sleeve $a^4$ and buffer $e$, interposed between the flange of each screw and respective friction-cones, and the holders $h$, supported from the cone-arms $b$ and provided with a polygonal slot for the reception of the like head of the screws, for the purpose set forth.

17. The combination, with a stationary toothed rail and a car-axle, of a car-brake comprising a toothed friction-wheel, a friction-cone arranged on opposite sides of the wheel, in which cones said wheel has bearing and revolves freely, and actuating devices for moving the cones into contact with the wheel, hangers consisting of angle-arms $b$, connected with the cones, and lowering and lifting devices for lowering the friction-wheel to or lifting it from the toothed rail, for the purpose set forth.

In testimony whereof I affix my signature in presence of two witnesses.

ALEXANDER BIEDERMANN.

Witnesses:
W. B. MURPHY,
JOHN H. FORSTER.